Patented May 26, 1942

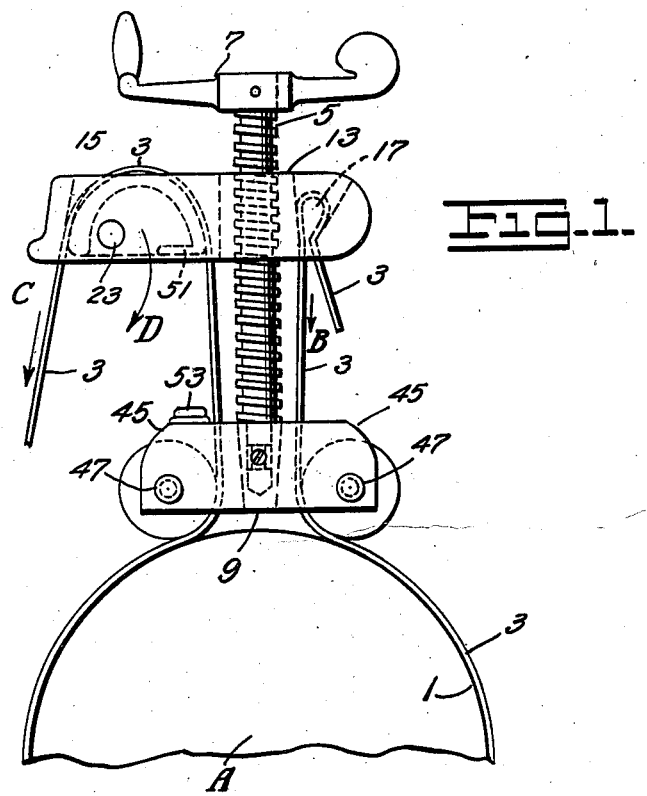
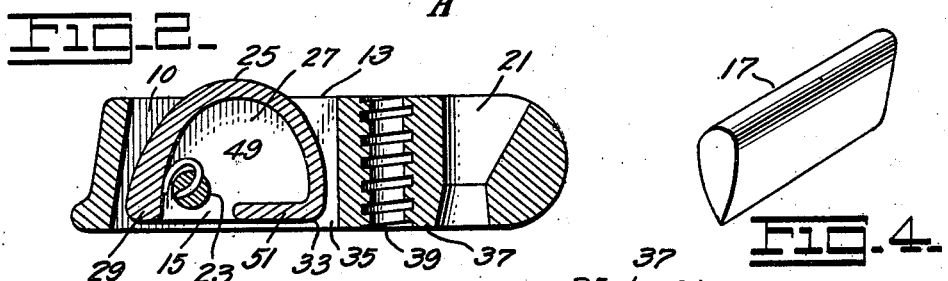
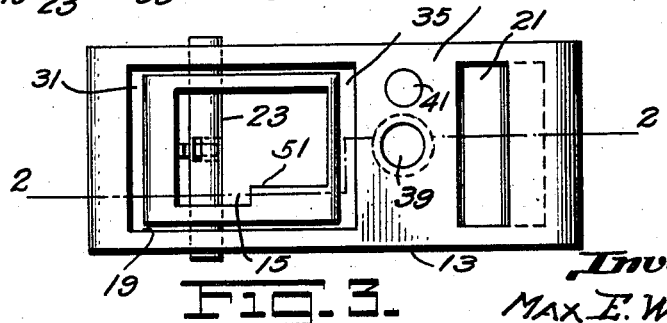

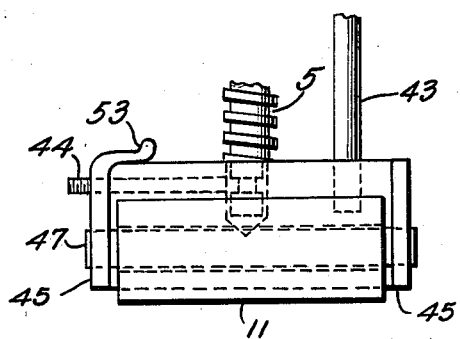
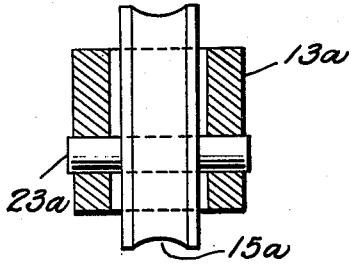
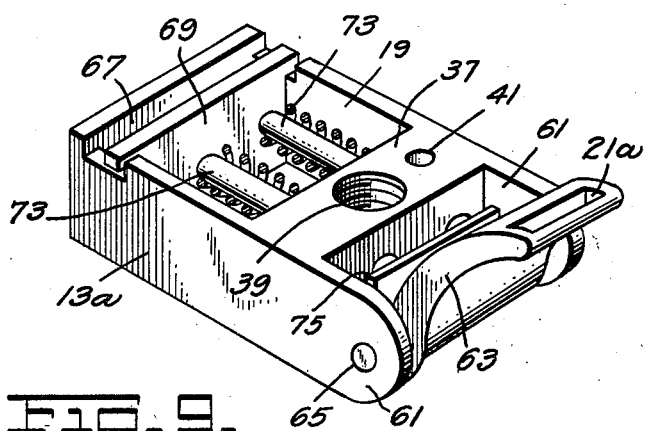
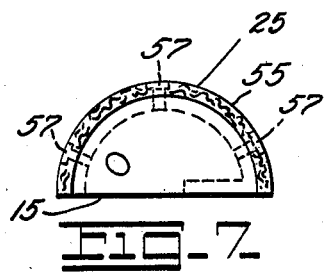
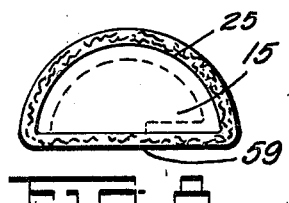
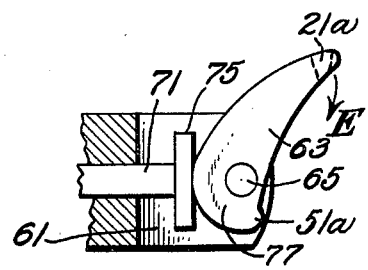

2,284,314

UNITED STATES PATENT OFFICE 2,284,314

CLAMP

Max E. Wetzler, Long Island City, N. Y.

Application October 24, 1940, Serial No. 362,605

9 Claims. (Cl. 24—19)

My invention relates to improvements in clamps and more particularly has reference to a clamp especially adapted for use in holding parts of furniture and the like while they are being glued, and has for its object to provide a clamp of the indicated type which is simple in construction and efficient in operation. The class of clamps referred to is characterized in that a flexible member as, for instance, a fabric band or tape, a steel band, a string, rope, cable, or chain is slung around an article and is then tightened by means of the clamp. In order to avoid involved explanations or terms, in the following specification and in the claims only the term "band" is used for designating said flexible member, it being understood however that this term as used in the specification and claims is intended to apply to any kind of a flexible member adapted to be used in connection with the clamp according to my invention and for the above indicated purposes.

Referring to the accompanying drawings:

Fig. 1 is a side view of a clamp forming one embodiment of my invention, the clamp being applied to a partly shown article.

Fig. 2 shows the clamping member of that clamp on an enlarged scale as a vertical cross-section along a broken line 2—2 in Fig. 3;

Fig. 3 is a plan view of said clamping member;

Fig. 4 shows the loose wedge forming part of the attaching means, in a perspective view;

Fig. 5 is a front view of the thrust member forming part of said embodiment of my invention;

Fig. 6 is a detail sectional view of an alternative embodiment of this invention in which the width of the rollers shown in Figs. 1 and 5 is very much reduced and the resulting member is a grooved roll adapted to guide a rope, chain or cable;

Figs. 7 and 8 are side views of the rocking lever forming part of the clamp illustrated in Figs. 1 to 3, the lever being, however, provided with a lining partly, or alternatively wholly, surrounding said lever;

Fig. 9 is a perspective view of another form of the clamping member, and

Fig. 10 is a fragmentary side view, partly in section, of the member shown in Fig. 9, and illustrates an alternative arrangement intended to open the clamp automatically.

Fig. 11 is a fragmentary view of a modification of the thrust member shown in Fig. 1.

In Fig. 1 the novel clamp is shown in operation on a table A or other piece of furniture upon the periphery of which veneer is to be applied. This veneer is held and pressed against the table A by a band 3 of steel, canvas or any suitable material. The two ends of the band 3 are engaged by the clamp which is seated against the article being treated.

The clamp chiefly consists of three parts: A spindle 5 with a handle 7; a thrust member 9 with the guide rolls or rollers 11; and the clamping member 13 with a clamping device exemplified by the rocking lever 15 and the wedge piece 17.

The clamping member 13 is provided with a rectangular opening 19 and with a slot 21. The opening 19 is adapted to receive said clamping device exemplified by the rocking lever 15 which is pivoted in that opening by means of a pin 23 extending across said opening and being located towards one outer side of the opening 19. The lever 15 has two arms which, however, are not clearly noticeable because they are connected by a protruding curved portion 25 and by side walls 27 which form as a whole a hollow body. The shape and location of said lever 15 are such that the left-hand end 29 of the lever 15 leaves only a small gap 31 between itself and the contiguous wall of the member 13 whilst the other arm 33 leaves a gap 35 between itself and the adjacent wall of member 13. The curved portion 25 is designed to lead the band 3 from the gap 35 in a curve to the gap 31 as is clearly shown in Fig. 1.

The slot 21 is located in the opposite end of the member 13 and has diverging walls so that it contracts towards the lower side of said member. A loose wedge piece 17 shown separately in Fig. 4 may be introduced into the slot 21 as is shown in Fig. 1, after the one end of the band 3 has been looped or folded around the wedge 17. As soon as a pull is exerted on that end of band 3 in direction of arrow B, the wedge piece 17 is tightly pressed into the reduced portion of slot 21 so that the adjacent portions of the looped end of the band 3 are firmly clamped to this end of the clamping member 13.

The solid portion 37 of the clamping member 13 between the opening 19 and the slot 21 is provided with a threaded bore 39 adapted to receive the spindle 5 so that the member 13 may ride thereon as will appear more fully hereinafter. An additional bore 41 is located adjacent to the bore 39 and is designed to receive and to slidably guide a rod 43 which will be described later.

The lower end of the spindle 5 is rotatably mounted in the thrust member 9 and is provided near its end with a small groove into which fits a set screw 44 whereby unintentional disconnection of the spindle 5 from the thrust member 9 is prevented without interference with the relative rotation of said spindle 5. The member 9 is provided with brackets 45 between which the rollers 11 are rotatably mounted on suitable pins or axles 47. The two ends of the band 3 are passed each between one of the rollers 11 and the central portion of the member 9.

In practice the clamp is operated as follows: If the one looped end of the band 3 has been attached by means of wedge 17 to the member 13 and the band has been placed in operative position as is shown in Fig. 1, the clamp is placed against the article A as shown and by pulling the free end of band 3 in the direction of arrow C, the band is tightened provisionally without any difficulty. Then by turning the spindle 5 with the aid of handle 7, the clamping member 13 which is in screw threaded connection with said spindle 5 is gradually moved away from the thrust member 9 whereby tension is built up in the band 3. Hereby and through the friction developed between the band 3 and the curved surface of the portion 25 of the lever 15, the latter is automatically and positively swung in the direction of arrow D whereby the width of the gap 31 is reduced and thus the portion of band 3 passing therethrough is firmly clamped against the adjacent wall of the opening 19. The more the spindle 5 is tightened, the stronger will be the grip of the clamping means described.

In order to insure a particularly quick action and to prevent an undesired slipping of the band 3 through the gap 31 until sufficient tension is built up in the band, it may be advisable to provide for means exerting a minimum pressure in the gap 31. To this end, a spring 49 may be fixed on the pin 23 so as to rest with its free end against the portion 29 of the lever 15.

Moreover it is advantageous to provide the device with means which will automatically release the grip of the lever 15 as soon as the spindle 5 is turned in the reverse direction and the member 15 almost reaches the member 9. To accomplish this, the lever 15 is provided with a suitable surface which is illustrated in the form of a lug 51 whereas the thrust member 9 is provided with a co-operating projection or extension 53 in such a manner that when the member 13 is shifted toward the member 9 by the reverse operation of the spindle 5, the projection or extension 53 will engage the lug 51 and thereby swing the lever 15 backwards so as to open up the gap 31 and thereby relieve the clamping action or grip of the lever 15 on the band 3.

In order to prevent any substantial relative movement of the members 9 and 13 about spindle 5, the previously mentioned rod 43 is rigidly fixed in the central portion of member 9 and slidably lodged in the plain bore 41 of the member 13.

In some cases it may be desirable to use a very narrow band or other flexible member, as it is obvious that the width of this member does not affect the functioning of the clamp. Therefore a band or member with an almost circular cross-section such as that of a rope or cable, or even a chain may be used instead of the illustrated band. In such case, the rollers 11 and the lever 15 may be in the nature of a grooved roll. The lever 15 may be replaced by a grooved roll 15ᵃ mounted in a narrow frame 13ᵃ by means of a pin or axle 23ᵃ passing through an eccentrically displaced bore of the roll 15ᵃ.

Of course, the above described arrangement is only one additional embodiment of my invention and many alterations may be introduced without departing from the fundamental idea. For instance, the band, tape, cable or the like may also be attached to the clamping member 13 by well-known means other than the wedge 17 in the tapered slot 21. Further the rollers 11 may in some cases be dispensed with and replaced by rigid guiding surfaces of appropriate curvature forming an integral part of the thrust member 9.

It has been found that where a steel band is used as the flexible member, the friction between this band and the round portion of the lever 15 is not quite sufficient to produce the desired results, particularly if oil or grease should be spread over one of the contacting surfaces thereof. Also the gap 31 would have to be generally narrower when using a steel band than in the case of a strong canvas band. Thus it is advisable to provide the curved portion 25 of lever 15 with a lining 55 as is shown for instance in Fig. 7, said lining being such as to develop the desired degree of friction. The lining may be attached in any suitable manner as by suitably disposed nails or screws 57. According to the example shown in Fig. 8, the lining may alternatively consist of a tubular section 59 of friction developing material. This section 59 having appropriate diameter may simply be slipped over the lever 15 and in most instances needs no further fixation. It may be moved around the lever 15 from time to time or may even travel automatically during the use of the clamp so that various portions of the section 59 will be used at the pressing point in the gap 31. Thus the wear of this lining will be gradually distributed over its entire surface.

Fig. 9 shows an alternative embodiment of my invention. Generally, in this embodiment the arrangement is the same as before with only the clamping member and the clamping means of different form. Therefore Fig. 9 shows only the clamping member 13ᵃ, which also comprises a central portion 37 with the thread bore 39 and the plain bore 41, and the opening 19. Instead of the tapered slot 21, an open portion is provided between brackets 61. A rocking lever 63 is pivoted between said brackets 61 by means of a pin 65, and extends upwardly and outwardly and at its outer end may be provided with a tapering slot 21ᵃ for the same purpose of attaching to it the one end of the band 3 as in the first described example. In the opening 19 the gap for clamping the other end of the band 3 is determined by a space left between the outer wall 67 of the opening 19 and a presser member illustrated in the form of a slidable pressing plate 69. Two rods or pins 71 are attached to the plate 69 and extend lengthwise of the member 13 and through appropriate guiding bores in the central portion 37. Helical springs 73 are mounted on the rods 71 in the opening 19 between the pressing plate 69 and the opposite wall of the opening 19 so as to push the plate 69 always toward the wall 67. The outer ends of the pins 71 may be connected with each other by a cross bar 75 which rests against the second, cam-like arm of lever 63. The cam portion 77 of said lever 63 will press the plate 69 against the band passing through the gap left between it and the wall 67 as soon as the lever 63 is swung downwardly in the direction of arrow E. This movement will be automatically caused as a result of the pull developed by the attached band 3 when the spindle 5 is operated to force the co-operating clamping member 13, away from the associated thrust member, so that again any tension built up in the band by operating the spindle will cause a firm clamping of the other end of the same band.

Also in this case an automatic release of the clamping grip may be effected by a projection or extension 53a provided on member 9 acting on a co-operating lug or projection 51a arranged at an opposed part of the lever 63.

Having now described some embodiments of my invention, I wish to point out that these embodiments and the corresponding illustrations are only intended to refer to examples since many alterations and variations thereof may be introduced by those skilled in this art without departing from the inventive idea.

What I claim is:

1. A clamp of the character described comprising a thrust member adapted to engage an element to be clamped, a loop formed of a flexible element operatively combined with said thrust member and arranged to encircle the element to be clamped, clamping means in clamping association with said loop forming element, means for adjusting said clamping means relatively to said thrust member to reduce the effective dimensions of said loop to thereby cause the latter to develop a clamping action on the element to be clamped, and co-operating means on said thrust member and said clamping means whereby the latter is automatically operated as said clamping means is shifted toward said thrust member to release the loop forming element from its clamping association with said clamping means to thereby relieve the clamping action on said first named element.

2. A clamp of the character described comprising a flexible loop forming band for encircling an element to be clamped, a thrust member in guiding association with said band and adapted to engage said element, a clamping member having one end portion of said loop forming band connected therewith, a clamping device on said clamping member acting on another portion of said loop forming band to fix the latter in clamping position, operating means for adjusting said clamping member relatively to said thrust member to cause said clamping device to develop a clamping grip on said band and to reduce the dimensions of said loop whereby the latter developes a clamping force on said element, and means whereby said clamping device is automatically operated to release its clamping grip on said loop forming band and to relieve the clamping force of the latter on said element.

3. A clamp of the character described comprising a flexible loop forming band for encircling an element to be clamped, a thrust member in guiding association with said band and adapted to engage said element, a clamping member having one end portion of said loop forming band connected therewith, a clamping device on said clamping member acting on another portion of said loop forming band to fix the latter in clamping position, operating means having an operative movement for adjusting said clamping member relatively to said thrust member to cause said clamping device to develop a clamping grip on said band and to reduce the dimensions of said loop whereby the latter developes a clamping force on such element, said operating means further having a movement of recovery whereby said clamping member is adjusted relatively to said thrust member, and co-operating means on said members whereby said clamping device is operated at a predetermined point in said movement of recovery to automatically release its clamping grip on said loop forming band and to relieve the clamping force of the latter on said element.

4. A clamp of the character described comprising a thrust member adapted to engage an element to be clamped, guiding means on said thrust member, a clamping member, a screwthreaded spindle in screwthreaded engagement with said clamping member and in rotatable thrust bearing connection with said thrust member, a flexible band in guiding engagement with the guiding means of said thrust member and forming a loop beyond the latter for encircling the element to be clamped, one end portion of said band being connected with said clamping member, a clamping device on said clamping member controlled by said band to develop a clamping grip on another portion of said band for fixing the latter in clamping position, said spindle being operative in one direction to adjust said clamping member away from said thrust member to thereby develop the clamping grip of said clamping device on said band and to decrease the dimension of said loop whereby the latter developes a clamping force on said element, and being operative in a reverse direction to adjust said clamping member toward said thrust member, and co-operating means on said thrust member and clamping device whereby the latter is automatically actuated to release its clamping grip on said band as said members are adjusted toward each other and to relieve the clamping force of said band on said element.

5. A clamp of the character described comprising a thrust member adapted to engage an element to be clamped, guide rollers on said thrust member, a clamping member, a screwthreaded spindle in screwthreaded engagement with said clamping member and in rotatable thrust bearing connection with said thrust member, a clamping device pivotally mounted on said clamping member, a flexible band in engagement with the rollers of said thrust member and forming a loop beyond the latter adapted to encircle said element to be clamped, one end of said band being connected with said clamping member and the other end portion of said band passing over said clamping device and between the latter and said clamping member, said spindle being operative in one direction to adjust said clamping member away from said thrust member to thereby cause said band to pivotally operate the clamping device whereby the latter developes a clamping grip on said other end portion of the band and the dimensions of the loop is reduced to thereby develope a clamping force on said element, and said spindle being operative in a reverse direction to adjust said clamping member toward said thrust member to relieve the clamping action of said loop on said element, and means on said thrust member adapted to engage and pivotally operate said clamping device as said clamping member approaches said thrust member to thereby relieve the clamping grip of said clamping device on said other end portion of said band whereby the latter is automatically released.

6. A clamp of the character described comprising a clamping member provided with a rectangular opening and having a slot, a rocking lever pivotally mounted in said opening and having a curved surface extending in proximity to a contiguous wall of said opening and co-operating with said wall to develop a clamping action as said rocking lever is pivotally actuated in an operative direction, a thrust member adapted to engage an element to be clamped, guide rollers on said thrust member, a flexible band in surface engagement with said guide rollers and forming a loop beyond said thrust member adapted to encircle said element to be clamped, one end of said band being detachably connected with the clamping member in the slot thereof and the other end portion of said band passing over the curved surface of the rocking lever in engagement therewith and between said curved surface and said contiguous wall of said opening, and a screwthreaded spindle in screwthreaded engagement with the clamping member and in rotatable thrust bearing connection with said thrust member, said spindle being operative in one direction to adjust said clamping member away from the element engaging thrust member to thereby cause the band to rock said rocking lever and clamp said band between said curved surface and said contiguous wall and to reduce the dimension of said loop and clamp said element, and said spindle being operative in the reverse direction to adjust said clamping member toward said element engaging thrust member to relieve the clamping action of said loop on said element.

7. In a clamp of the character described, a clamping member provided with a rectangular opening and having spaced brackets, a presser member in co-operative clamping relation with a wall of said opening, parallel rods carrying said presser member and slidably mounted on said clamping member, springs effective on said presser member, a cross-bar connecting said rods and located between said brackets, a rocking lever pivoted between said brackets provided with a slot whereby one end of a loop forming clamping band is connected with said lever, and a cam portion carried by said lever in operating engagement with said cross-bar whereby said rods and presser member are actuated when tension is developed by said said band on said lever to clamp another portion of said band against a wall of said clamping member to clamp the loop thereto.

8. In a clamp of the character described, a clamping member provided with a rectangular opening and having spaced brackets, a presser member in co-operative clamping relation with a wall of said opening, parallel rods carrying said presser member and slidably mounted on said clamping member, springs effective on said presser member, a cross-bar connecting said rods and located between said brackets, a rocking lever pivoted between said brackets provided with a slot whereby one end of a loop forming clamping band is connected with said lever, a cam portion carried by said lever in operating engagement with said cross-bar whereby said rods and presser member are actuated when tension is developed by said band on said lever to clamp another portion of said band against a wall of said clamping member to clamp the loop thereto, and a lug on said lever arranged to be engaged by a co-operating pressure developing member to rock said lever and thereby relieve the clamping action of said presser member.

9. A clamp of the kind described comprising a thrust member adapted to engage an element to be clamped, means associated with said thrust member for developing a clamping force whereby said element is clamped in place, clamping means in gripping association with said first means, means for adjusting said clamping means relatively to said thrust member to cause said first means to develope a clamping force on said element, and co-operating means on said thrust member and clamping means whereby the latter is operated as said clamping means is shifted toward said thrust member to release the first means from said clamping means and to relieve the clamping force of said first means on said element.

MAX E. WETZLER.